(12) United States Patent
Huang et al.

(10) Patent No.: US 11,669,121 B2
(45) Date of Patent: Jun. 6, 2023

(54) JOYSTICK AND IMAGE IDENTIFYING METHOD

(71) Applicant: PixArt Imaging Inc., Hsin-Chu (TW)

(72) Inventors: Chao-Chien Huang, Hsin-Chu (TW); Yi-Chung Chen, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 251 days.

(21) Appl. No.: 17/152,730

(22) Filed: Jan. 19, 2021

(65) Prior Publication Data

US 2022/0229460 A1 Jul. 21, 2022

(51) Int. Cl.
*G05G 9/047* (2006.01)
*G06F 3/0338* (2013.01)

(52) U.S. Cl.
CPC ............ *G05G 9/047* (2013.01); *G06F 3/0338* (2013.01); *G05G 2009/04748* (2013.01); *G05G 2009/04759* (2013.01)

(58) Field of Classification Search
CPC ......... G05G 9/047; G05G 2009/04748; G05G 2009/04759; G06F 3/0338
USPC ....................................................... 338/128
See application file for complete search history.

(56) References Cited

U.S. PATENT DOCUMENTS

| | | | | |
|---|---|---|---|---|
| 5,499,098 A * | 3/1996 | Ogawa | ................... | G06F 3/0325 356/621 |
| 5,949,404 A * | 9/1999 | Zabel | ..................... | G05G 9/047 345/161 |
| 2007/0126700 A1* | 6/2007 | Wright | .................. | G06F 3/0321 345/161 |
| 2019/0056759 A1* | 2/2019 | Wang | ...................... | G06F 3/038 |

* cited by examiner

*Primary Examiner* — Mark Edwards
(74) *Attorney, Agent, or Firm* — Winston Hsu

(57) ABSTRACT

A joystick includes a casing, a stick body, an identification mark and an optical sensor. The casing has a hole. The stick body is movably disposed on the casing. The stick body has a first section and a second section. The first section penetrates through the hole to protrude from the casing, and the second section is inside the casing. The identification mark is disposed on the second section of the stick body. The identification includes a first line group and a second line group crossed to each other. The first line group and the second line group respectively has a plurality of lines with different widths and arranged adjacent to each other. The optical sensor is disposed inside the casing and adapted to acquire an identification image containing the identification mark to determine a gesture of the stick body.

24 Claims, 6 Drawing Sheets

JOYSTICK AND IMAGE IDENTIFYING METHOD

BACKGROUND OF THE INVENTION

1. Field of the Invention

The present invention relates to a joystick and an image identifying method, and more particularly, to a joystick capable of being rotated and detecting an initial position and a related image identifying method.

2. Description of the Prior Art

A conventional optical joystick includes an optical sensor, a control bar and a handle. A part of the control bar is protruded from a casing of the optical joystick, and connected to the handle for being operated. Another part of the control bar has an identification mark and is disposed inside the casing of the optical joystick. The optical sensor analyzes the identification mark to determine a gesture of the handle. The conventional identification mark is a symmetric pattern or an asymmetric pattern. If the conventional identification mark is the symmetric pattern, the optical sensor cannot accurately decide a rotation direction of the control bar; if the conventional identification mark is the asymmetric pattern, the optical sensor cannot accurately decide a shifting position of the control bar and cannot determine an initial position of the control bar when the optical joystick is fiercely moved. Thus, design of an optical joystick capable of accurately determining the rotation direction, the shifting position and the initial position of the control bar is an important issue in the optical control apparatus industry.

SUMMARY OF THE INVENTION

The present invention provides a joystick capable of being rotated and detecting an initial position and a related image identifying method for solving above drawbacks.

According to the claimed invention, a joystick includes a casing, a stick body, an identification mark and an optical sensor. The casing has a hole. The stick body is movably disposed on the casing. The stick body has a first section and a second section. The first section penetrates through the hole to protrude from the casing, and the second section is inside the casing. The identification mark is disposed on the second section of the stick body. The identification includes a first line group and a second line group crossed to each other. The first line group and the second line group respectively have a plurality of lines with different widths and arranged adjacent to each other. The optical sensor is disposed inside the casing and adapted to acquire an identification image containing the identification mark, and analyze feature variation of the first line group and the second line group within the identification image to determine a gesture of the stick body. The first line group comprises several coarse lines and several fine lines, the coarse lines have the same width, the fine lines have the same width, and each coarse line is arranged between two fine lines.

According to the claimed invention, the coarse lines and the fine lines are parallel to each other. The second line group includes several coarse lines and several fine lines. The coarse lines of the second line group have the same width as the coarse lines of the first line group, and the fine lines of the second line group have the same width as the fine lines of the first line group. An interval between one coarse line and an adjacent fine line of the first line group is smaller than a dimension of a monitoring range of the optical sensor. The interval is the same as another interval between another coarse line and a related adjacent fine line of the first line group.

According to the claimed invention, the optical sensor analyses several first overlapped regions about the first line group and image sides within the identification image and several second overlapped regions about the second line group and other image sides within the identification image, so as to acquire a first connection line between the first overlapped regions and a second connection line between the second overlapped regions, and then acquire an intersection point of the first connection line and the second connection line.

According to the claimed invention, one line of the first line group is intersected by the image sides to form two first overlapped regions, and the two first overlapped regions are used to form the first connection line and the intersection point. Further, two lines of the first line group are intersected by the image sides to form four first overlapped regions, two of the four first overlapped regions are resulted from the same line of the two lines, and the said two first overlapped regions are used to form one corresponding first connection line.

According to the claimed invention, the optical sensor includes a plurality of sensing units arranged as a matrix, and each of the image sides is defined as a capturing region covered by at least one row of the sensing units or at least one column of the sensing units.

According to the claimed invention, the optical sensor analyses position variation of the intersection point to determine an incline direction and inclined amplitude of the stick body. Further, the optical sensor analyses position variation of the first connection line and the second connection line to determine a rotated direction and rotated amplitude of the stick body. Further, the optical sensor analyses intensity variation of the identification image to determine pressed amplitude of the stick body, or the optical sensor analyzes interval variation between two lines of the first line group to determine pressed amplitude of the stick body. The said two lines of the first line group are adjacent to each other, or at least one line is set between the said two lines of the first line group.

According to the claimed invention, the joystick further includes a memory module electrically connected to the optical sensor and adapted to store the identification image and/or a reference image. The optical sensor has a processor adapted to analyze identification image, or the optical sensor has a transmission interface adapted to transmit the identification image to an external processor for analysis.

According to the claimed invention, an image identifying method is applied to an joystick. The joystick analyzes an identification mark on a stick body, and the identification mark has a first line group and a second line group crossed to each other. The first line group and the second line group respectively has a plurality of lines with different widths arranged adjacent to each other. The image identifying method includes acquiring an identification image containing the identification mark, acquiring several first overlapped regions about at least one line of the first line group and image sides within the identification image, acquiring several second overlapped regions about at least one line of the second line group and other image sides within the identification image, and analyzing the first overlapped regions and the second overlapped regions to determine a gesture of the stick body. The first line group comprises several coarse lines and several fine lines, the coarse lines have the same width, the fine lines have the same width, each coarse line is arranged between two fine lines.

According to the claimed invention, the image identifying method further analyzes whether the said image sides are overlapped by at least one of the coarse lines and the fine lines to acquire the first overlapped regions. The image identifying method further analyzes dimensional variation in the said overlapped region of the said image sides and the said lines for determining whether to enlarge or reduce sizes of the said image sides.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
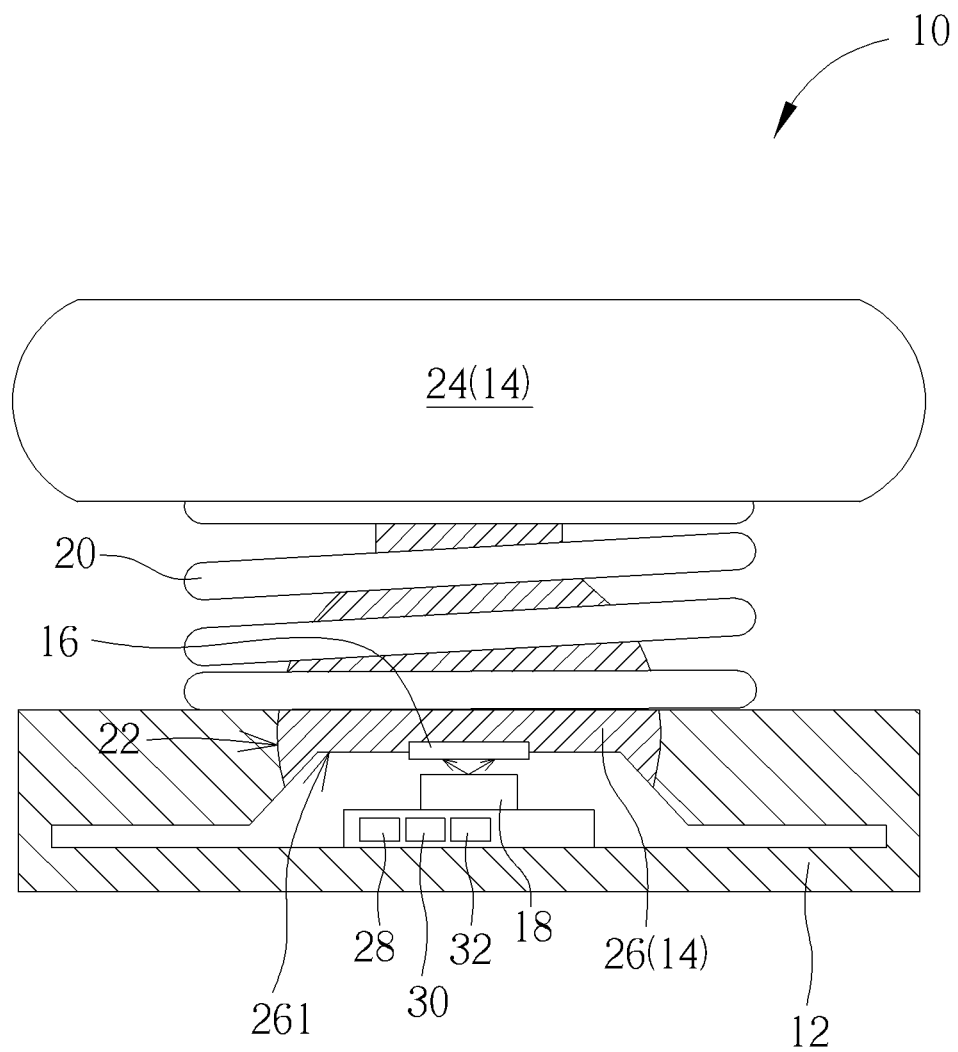
FIG. 1 is a schematic diagram of a joystick according to an embodiment of the present invention.
Figure 2:
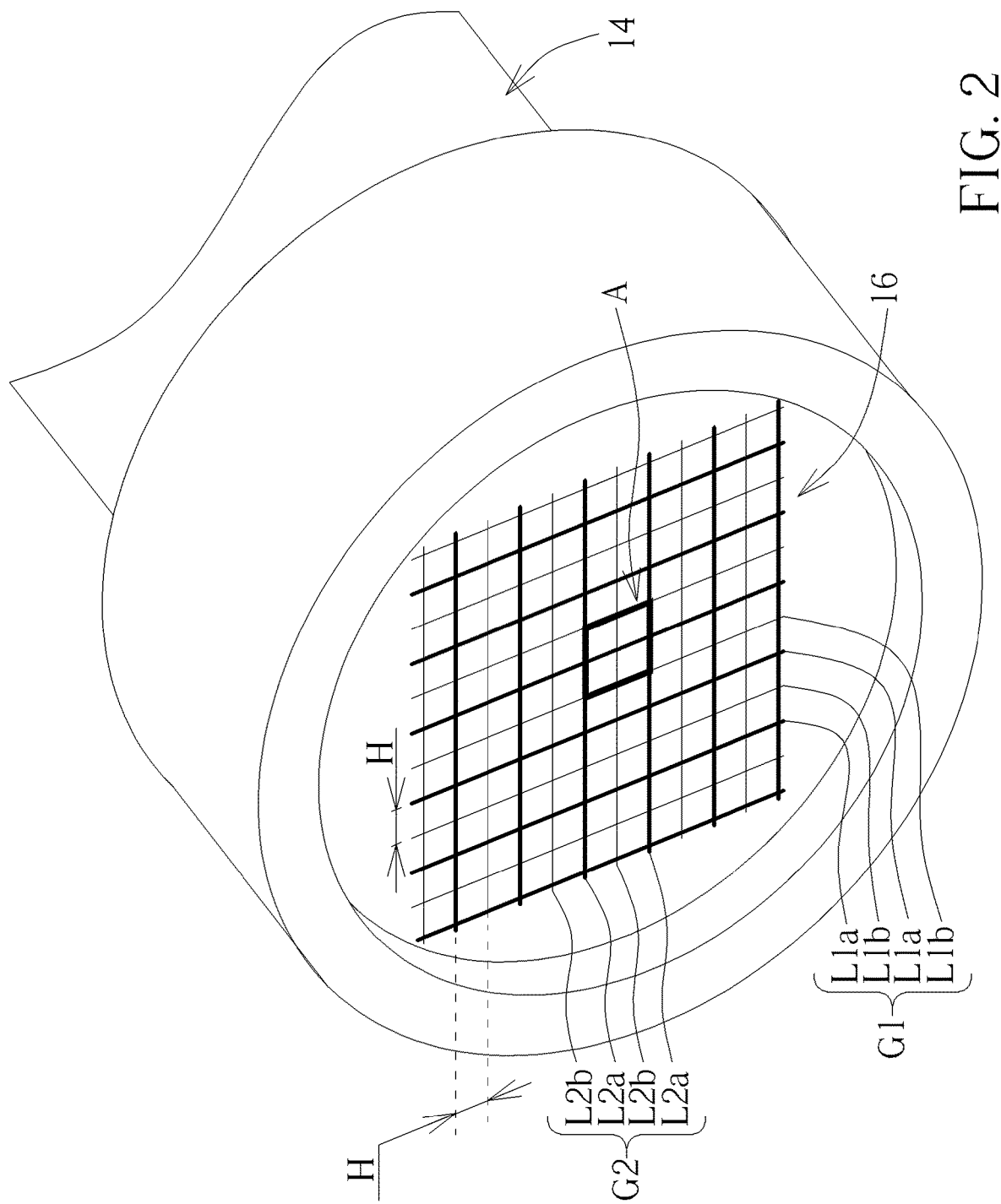
FIG. 2 is a diagram of a part of the joystick according to the embodiment of the present invention.

Please refer to FIG. 1 to FIG. 6. FIG. 1 is a schematic diagram of a joystick 10 according to an embodiment of the present invention. FIG. 2 is a diagram of a part of the joystick 10 according to the embodiment of the present invention. FIG. 3 to FIG. 6 are diagrams of an identification image I acquired by the joystick 10 respectively in different situations according to the embodiment of the present invention. The joystick 10 can include a casing 12, a stick body 14, an identification mark 16, an optical sensor 18 and a resilient component 20. A shape of the casing 12 can be designed according to a demanded outward appearance. The stick body 14 can movably penetrate through a hole 22 formed on the casing 12. The stick body 14 can include a first section 24 and a second section 26. The first section 24 can penetrate through the hole 22 to protrude from and expose out of the casing 12, for being an operation interface of the joystick 10. The second section 26 can be accommodated inside the casing 12 for being a carrier of the identification mark 16.

The resilient component 20 can be a compression spring, which is disposed between the casing 12 and the stick body 14. When the stick body 14 is pushed or rotated by an external force, the resilient component 20 can be resiliently deformed to store a resilient recovering force; when the external force applied to the stick body 14 is removed, the resilient recovering force of the resilient component 20 can be released to move the stick body 14 back to an initial position. Besides, the resilient component 20 may be any type of springs, which depends on a design demand. In the embodiment of the present invention, a sunken space 261 can be formed on a side of the second section 26 of the stick body 14 facing the optical sensor 18, and the identification mark 16 can be disposed on a bottom surface inside the sunken space 261. If the second section 26 has no sunken space, the identification mark 16 can be formed on an outer surface of the second section 26 facing the optical sensor 18.

The optical sensor 18 can be disposed on a circuit board (which is not marked in the figures) inside the casing 12. The optical sensor 18 can have a monitoring region A used to align with the identification mark 16 of the stick body 14, and the optical sensor 18 can acquire the identification image I covering all part or some part of the identification mark 16, where the identification image I is captured in the monitoring region A of the optical sensor 18. The joystick 10 may optionally include a memory 28 electrically connected to the optical sensor 18. The memory 28 can be a built-in memory of the joystick 10, or can be any other component with an information storage function. The memory 28 can store the identification image I and/or a reference image (which is not shown in the figures). The identification image I can be acquired by the optical sensor 18. The reference image can be captured by the optical sensor 18, or can be pre-stored in the memory 28 according to a property of the identification mark 16.

In addition, the optical sensor 18 can include a processor 30 used to analyze the identification image I, and further to optionally compare the identification image I with the reference image. The processor 30 can be any kind of processor, such as an image processor, or a processing thread in a MCU, which can be used to compress, display and store the image. Further, the optical sensor 18 may include a transmission interface 32, such as a wireless information transceiver or a wired transmission port. The optical sensor 18 can transmit the identification image I to an external processor via the interface 32 for external analysis and identification. The said external processor can be a central processing unit (CPU) or graphic processing unit (GPU) of a computer system which is electrically connected to the joystick 10.

The identification mark 16 can include a first line group G1 and a second line group G2 which are crossed to each other. The first line group G1 can have several first lines arranged side by side and having different widths, and the second line group G2 can have several second lines arranged side by side and having different widths. For example, the first line group G1 can include some first coarse lines L1$a$ and some first fine lines L1$b$. Each of the first coarse lines L1$a$ can be parallel to each of the first fine lines L1$b$. The first coarse lines L1$a$ can have the same broad width. The first fine lines L1$b$ can have the same narrow width. Each first coarse line L1$a$ can be disposed between two adjacent first fine lines L1$b$, or each first fine line L1$b$ can be disposed between two adjacent first coarse lines L1$a$. Features of the first lines are not limited to the above-mentioned embodiment, which depends on a design demand.

Accordingly, the second line group G2 can include some second coarse lines L2$a$ and some second fine lines L2$b$. Each of the second coarse lines L2$a$ can be parallel to each of the second fine lines L2$b$. The second coarse lines L2$a$ can have the same broad width, which may be similar to or the same as the width of the first coarse lines L1$a$. The second fine lines L2$b$ can have the same narrow width, which may be similar to or the same as the width of the first fine lines L1$b$. Each second coarse line L2$a$ can be disposed between two adjacent second fine lines L2$b$, or each second fine line L2$b$ can be disposed between two adjacent second coarse lines L2$a$. Features of the second lines are not limited to the above-mentioned embodiment, which depends on a design demand.

As shown in FIG. 2, an interval H between one first coarse line L1$a$ and an adjacent first fine line L1$b$ of the first line group G1 can be similar to or the same as the interval H between another first coarse line L1$a$ and its adjacent first fine line L1*b*, and further be similar to or the same as the interval H between one second coarse line L2*a* and its adjacent second fine line L2*b* of the second line group G2. The interval H preferably is determined that a block surrounding by two adjacent lines of the first line group G1 and two adjacent lines of the second line group G2 can be fit in the monitoring region A when captured by the optical sensor 18. When the stick body 14 is shifted or rotated relative to the optical sensor 18, the identification image I of the optical sensor 18 can catch at least one line of the first line group G1 and at least one line of the second line group G2.

Figure 3:
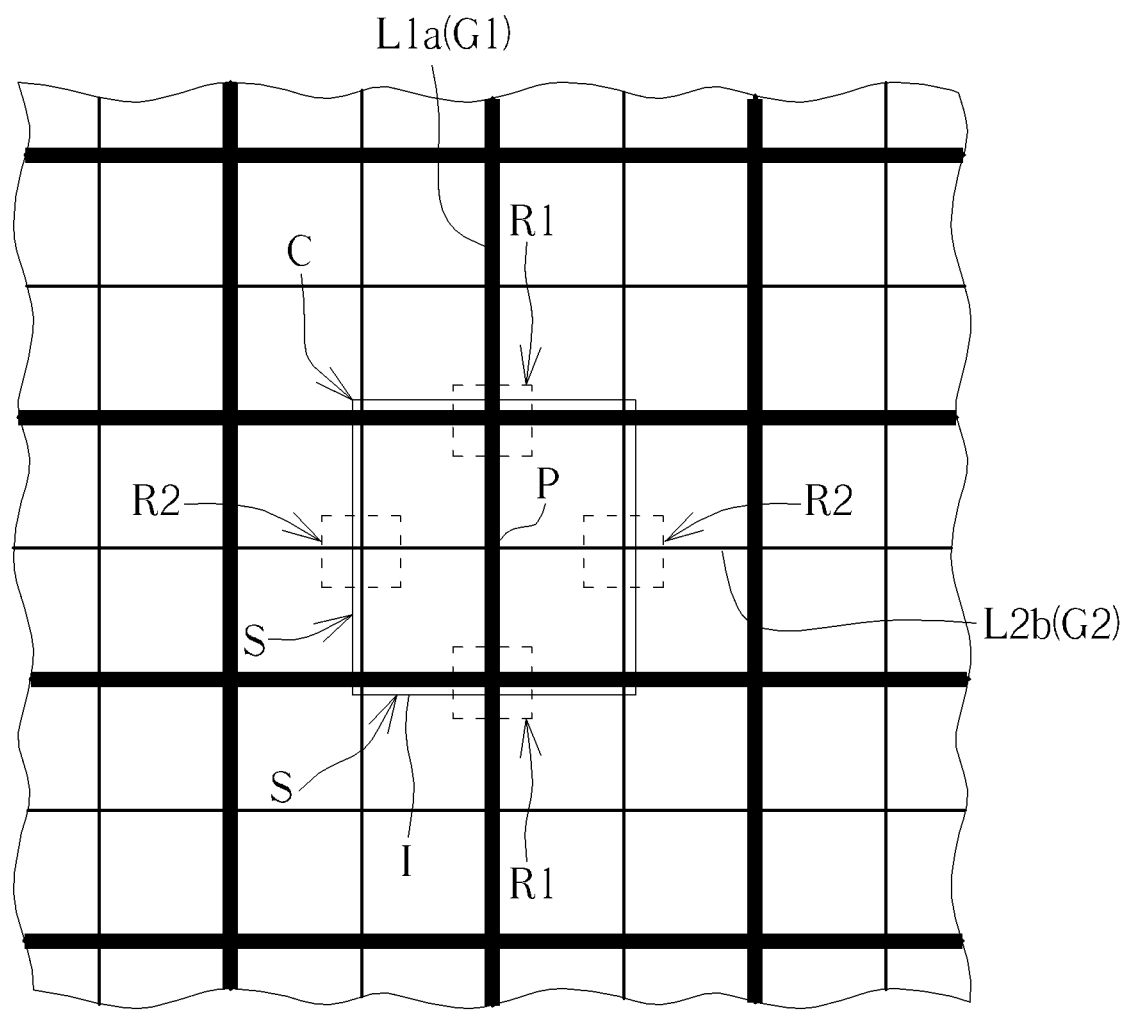
FIG. 3 to FIG. 6 are diagrams of an identification image acquired by the joystick in different situations according to the embodiment of the present invention.
Figure 4:
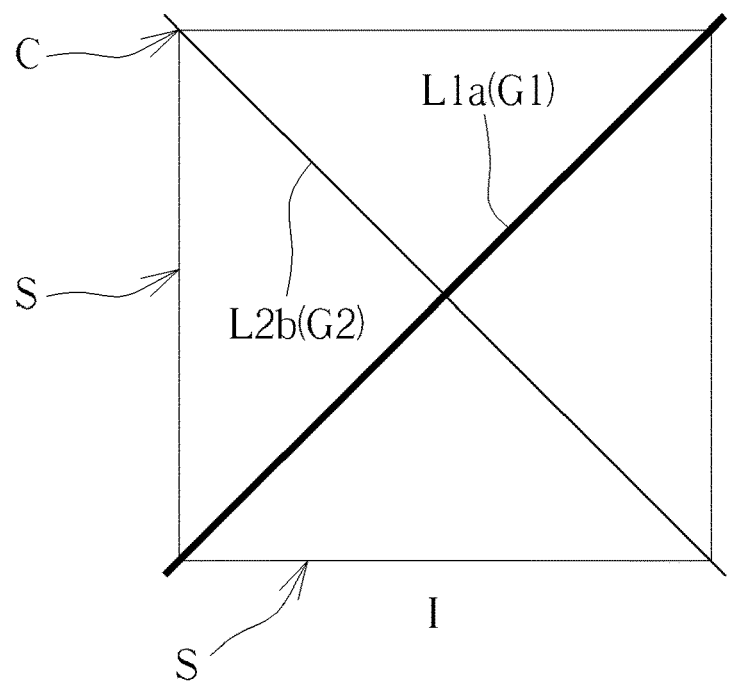
Figure 5:
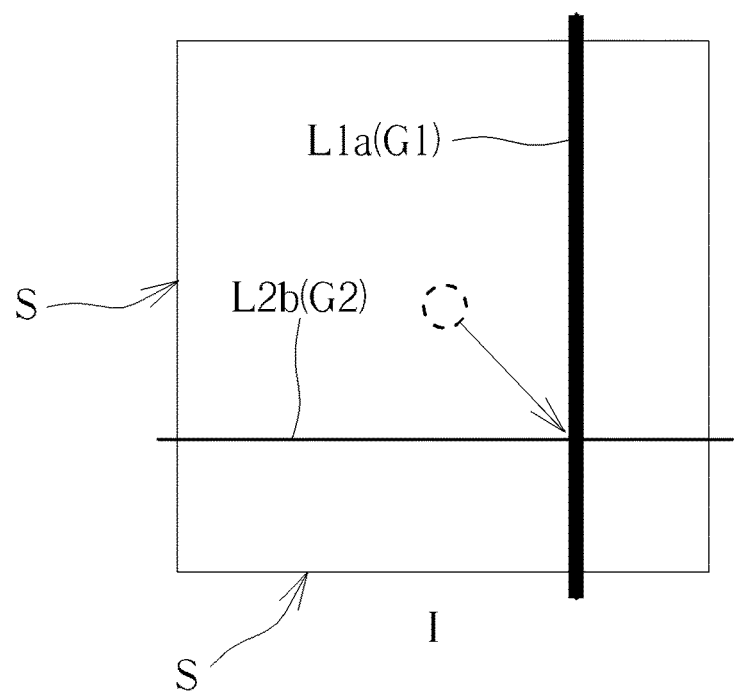
Figure 6:
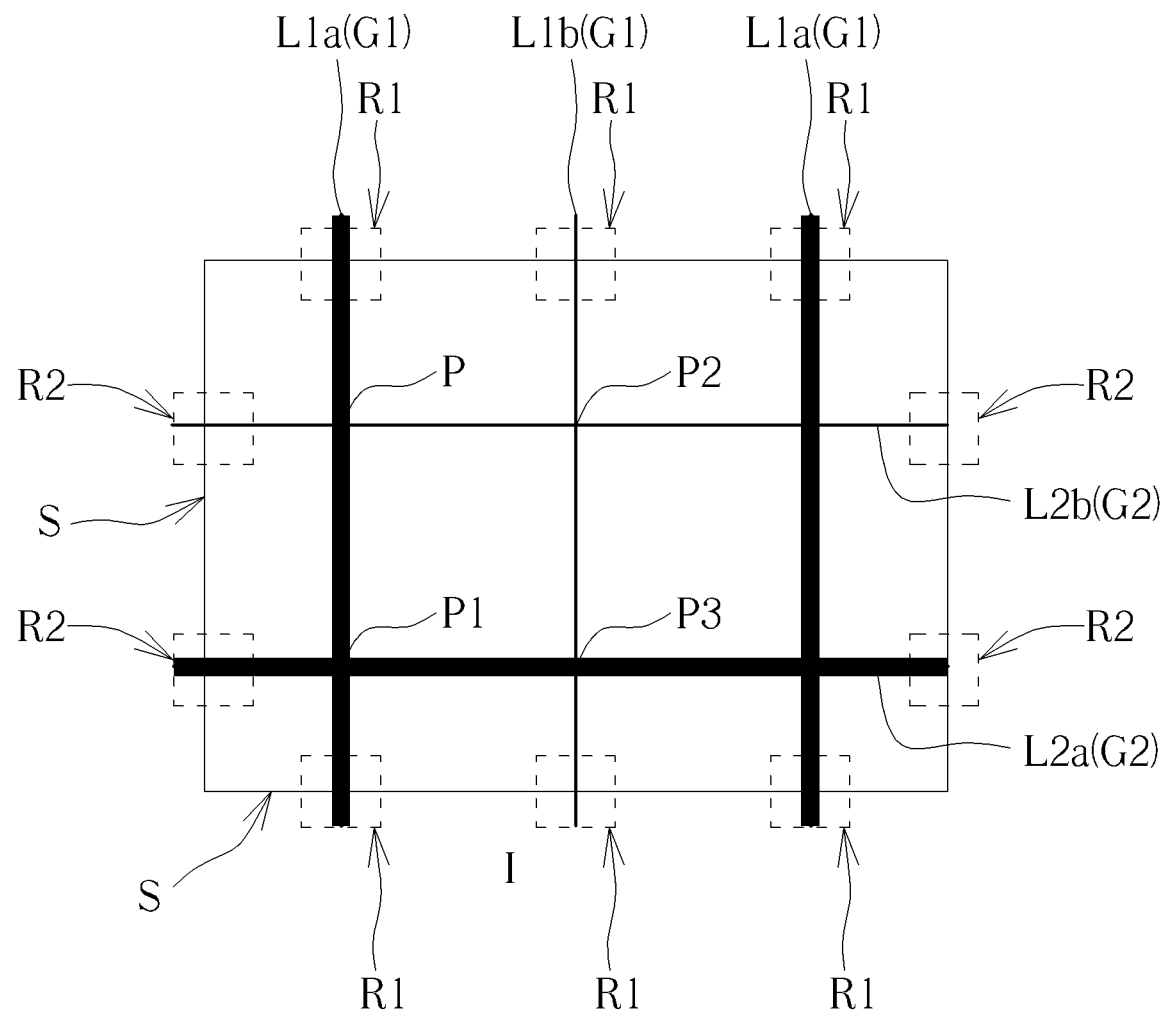

After the identification image I is captured, images of at least one first line (L1*a* or L1*b*) of the first line group G1 and at least one second line (L2*a* or L2*b*) of the second line group G2 are contained in the identification image I. Each first line captured in the identification image I generates two first overlapped regions R1 which indicate the overlap regions of the captured first line and two sides S of the identification image I. Similarly, each second line captured in the identification image I generates two second overlapped regions R2 which indicate the overlap regions of the captured second line and two sides S of the identification image I. For example, if one second line is captured within the identification image I, two second overlapped regions R2 can be generated accordingly, as shown in FIG. 3 to FIG. 5; if two second lines are captured within the identification image I, four second overlapped regions R2 can be generated, as shown in FIG. 6.

The optical sensor 18 can utilize a plurality of sensing units arranged as a matrix to generate the identification image I, and all the sensing units of the optical sensor 18 can be actuated to acquire the identification image I that contains the first line (which means the first coarse line L1*a* or the first fine line L1*b*) and the second line (which means the second coarse line L2*a* or the second fine line L2*b*). In other possible embodiment, for energy economy, the joystick 10 of the present invention may actuate parts of the sensing unit columns and parts of the sensing unit rows of the sensing unit matrix that have a smaller capturing region. For example, if the optical sensor 18 has the 100×100 sensing unit matrix, the joystick 10 may actuate three of the rightmost sensing unit columns, three of the leftmost sensing unit columns, three of the uppermost sensing unit rows, and three of the lowermost sensing unit rows within the sensing unit matrix; the three sensing unit columns respectively on the far right and on the far left within the sensing unit matrix, and the three sensing unit rows respectively on the far top and one the far bottom within the sensing unit matrix can be sufficient to detect a partial section of the first line (which means the first coarse line L1*a* or the first fine line L1*b*) and a partial section of the second line (which means the second coarse line L2*a* or the second fine line L2*b*) for forming the first overlapped region R1 and the second overlapped region R2.

Dimensions of the first overlapped region R1 and the second overlapped region R2 in the captured image (which means the identification image I) may be enlarged or reduced according to rotation of the stick body 14. If the first overlapped region R1 (or the second overlapped region R2) between the first line (or the second line) and one or some lateral sides S of the identification image I is smaller than a minimum of a predefined threshold, the optical sensor 18 can enlarge a dimension of the lateral side S by actuating more pixel units near the lateral side S (e.g. four uppermost sensing unit rows) to increase the dimensions of the overlapped region R1 (or the second overlapped region R2); if the first overlapped region R1 (or the second overlapped region R2) is greater than or equal to a maximum of the predefined threshold, the optical sensor 18 can reduce the dimension of the lateral side S by actuating less pixel units near the lateral side S (e.g. two uppermost sensing unit rows) to decrease the dimensions of the overlapped region R1 (or the second overlapped region R2), and thus a detection accuracy of the optical sensor 18 can be increased accordingly. For example, if the stick body 14 is rotated to overlap the first line or the second line with a corner C of the identification image I, the overlapped region between the left lateral side S and/or the upper lateral side S of the identification image I and the first line or the second line may be smaller than the predefined threshold, so the joystick 10 can actuate six of the leftmost sensing unit columns and six of the uppermost sensing unit rows within the sensing unit matrix, and therefore a range of the first overlapped region R1 or the second overlapped region R2 can be enlarged to effectively increase the detection accuracy.

If the first line group G1 has one first line overlapped with the lateral side S of the identification image I, two first overlapped regions R1 can be generated, and a first connection line can be formed between the two first overlapped region R1; the first connection line can be interpreted as a kind of virtual first line. If the first line group G1 has two first lines overlapped with the lateral side S of the identification image I, four first overlapped regions R1 can be generated; two of the four first overlapped regions R1, which are sourced from the same first line of the said two first lines, can be connected to form one first connection line according to the width of the four first overlapped regions R1. For example, when the original point is defined by the intersection of two coarse lines then the two first overlapped regions R1 has wider width are chosen to form the first connection line. Accordingly, if the second overlapped regions R2 are found, the optical sensor 18 can form a second connection line via any two matched second overlapped regions R2, and the second connection line can be interpreted as a kind of virtual second line. An intersection point P can be located and defined at a crossed position between the first connection line and the second connection line.

The joystick 10 of the present invention can actuate some sensing units of the optical sensor 18 to accurately acquire each line position, two lines relation and the intersection point of the first line (which means the first coarse line L1*a* or the first fine line L1*b*) and the second line (which means the second coarse line L2*a* or the second fine line L2*b*), to economize energy consumption and increase computation efficiency.

As the identification image I shown in FIG. 3 and FIG. 4, the joystick 10 of the present invention can utilize the optical sensor 18 to analyze position variation of the first connection line (which means the first coarse line L1*a* or the first fine line L1*b*) and the second connection line (which means the second coarse line L2*a* or the second fine line L2*b*) for determining a rotated direction and rotated amplitude of the stick body 14. As the identification image I shown in FIG. 3 and FIG. 5, the joystick 10 may further utilize the optical sensor 18 to analyze position variation of the intersection point P for determining an incline direction and inclined amplitude of the stick body 14. Besides, the joystick 10 may utilize the optical sensor 18 to analyze an interval variation between two first lines of the first line group G1 or between two second lines of the second line group G2 for determining pressed amplitude of the stick body 14. It should be mentioned that the optical sensor 18 can analyze the interval variation between two adjacent first lines to decide the pressed amplitude of the stick body 14, such as the interval variation between the first coarse line L1*a* and the first fine line L1*b* of the identification image I, as shown in FIG. 6, or the optical sensor 18 can analyze the interval variation between two non-adjacent first lines to decide the pressed amplitude of the stick body 14, such as the interval variation between two first coarse lines L1*a* of the identification image I, as shown in FIG. 6.

Moreover, the joystick 10 may utilize the optical sensor 18 to analyze intensity variation of the identification image I for determining the pressed amplitude of the stick body 14. The intensity of the identification image I can be increased when the stick body 14 is moved close to the optical sensor 18; the intensity of the identification image I can be decreased when the stick body 14 is moved away from the optical sensor 18. The pressed amplitude of the stick body 14 can be decided according to the above-mentioned situations.

As shown in FIG. 6, the identification mark 16 of the present invention can be combined by several vertical lines with different widths and arranged side by side (such as the first line group G1) and several horizontal lines with different widths and arranged side by side (such as the second line group G2). The first coarse line L1*a* and the first fine line L1*b* of the first line group G1 can be respectively crossed by the second coarse line L2*a* and the second fine line L2*b* of the second line group G2 to form several intersection points; however, each intersection point can provide an identification feature different from the other adjacent intersection points. For example, the intersection point P can be formed by the first coarse line L1*a* and the second fine line L2*b*, and the intersection point P1 can be formed by the first coarse line L1*a* and the second coarse line L2*a*, and the intersection point P2 can be formed by the first fine line L1*b* and the second fine line L2*b*, and the intersection point P3 can be formed by the first fine line L1*b* and the second coarse line L2*a*.

If the optical sensor 18 found the intersection points P, P1, P2 and P3 within the identification image I, one of the intersection points can be selected to set as a current positioning standard, such as the intersection point P, and the position variation of the intersection point P can be analyzed to determine motion of the stick body 14. When the stick body 14 is fiercely shifted and/or rotated to move the intersection point P close to the lateral side S of the identification image I, the optical sensor 18 can set the intersection point P as a previous positioning standard, and further select one of the intersection points P1, P2 and P3 via a specific rule to set as the current positioning standard. For example, the optical sensor 18 may select the intersection point P2, which is close to a center of the identification image I, to be the current positioning standard. Thus, the joystick 10 of the present invention can immediately acquire at least one intersection point from the first line group G1 and the second line group G2 to be an identification base for executing automatic amendment of a relative coordinate system even though the stick body 14 has giant motion.

Figure 7:
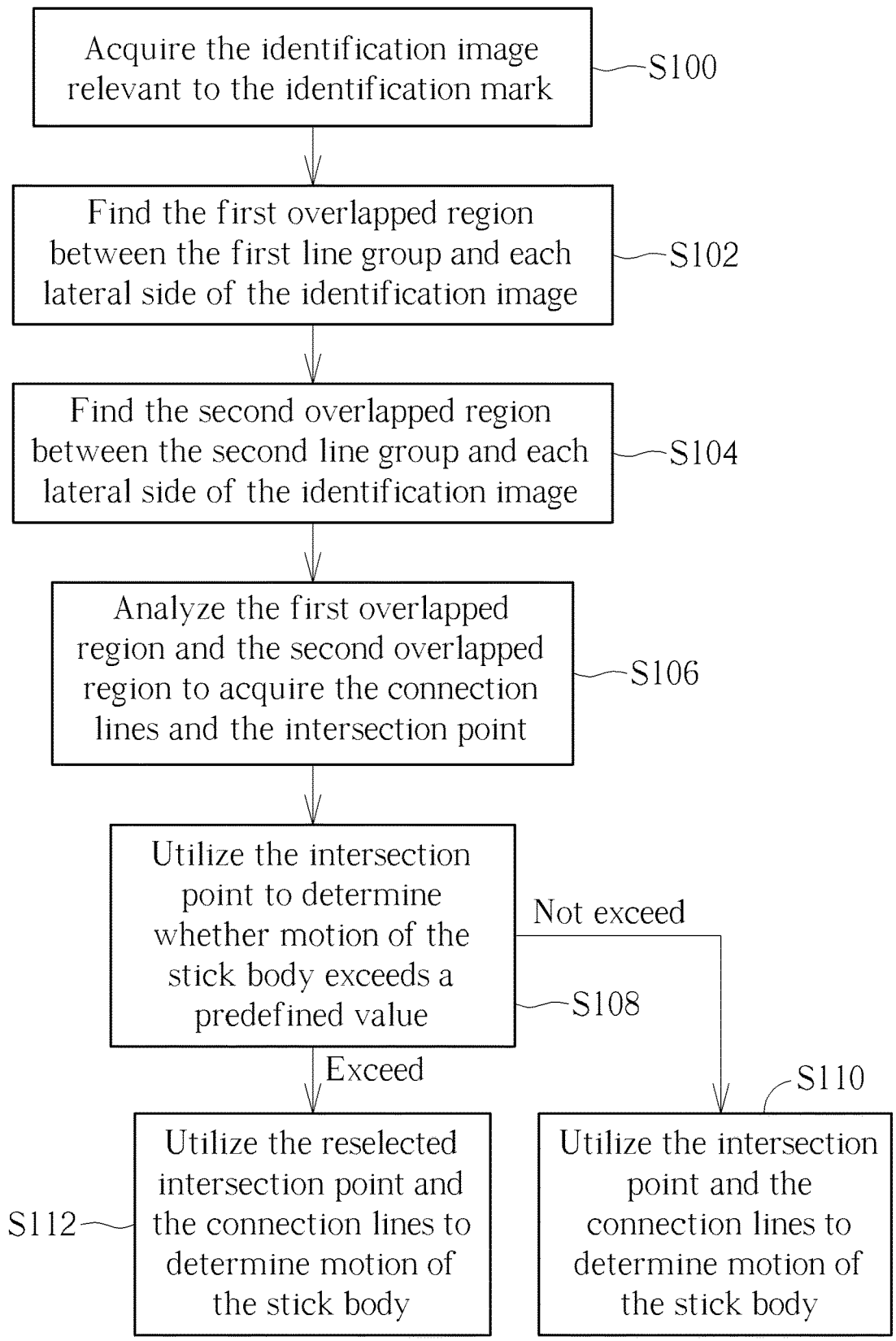
FIG. 7 is a flow chart of an image identifying method according to the embodiment of the present invention.

Please refer to FIG. 7. FIG. 7 is a flow chart of an image identifying method according to the embodiment of the present invention. The image identifying method illustrated in FIG. 7 can be suitable for the joystick 10 shown in FIG. 1. First, step S100 can be executed to acquire the identification image I relevant to the identification mark 16 by the optical sensor 18. Then, steps S102 and S104 can be executed to find out the first overlapped region R1 between the first line group G1 and each lateral side S of the identification image I, and further find out the second overlapped region R2 between the second line group G2 and each lateral side S of the identification image I. Later, steps S106 and S108 can be executed to analyze the first overlapped region R1 and the second overlapped region R for acquiring the first connection line, the second connection line and the intersection point, and then utilize the intersection point to determine whether the motion amplitude of the stick body 14 exceeds a predefined value. If the motion amplitude does not exceed the predefined value, step S110 can be executed to select one intersection point as the current positioning standard, and the connection lines and the selected intersection point can be used to determine the motion of the stick body 14; if the motion amplitude exceeds the predefined value, step S112 can be executed to reselect another intersection point as the current positioning standard, and then the connection lines and the reselected intersection point can be used to determine the motion of the stick body 14.

In steps S102 and S104, the image identifying method of the present invention can find out the first overlapped region R1 between the lateral side S of the identification image I and the first coarse line L1*a* and/or the first fine line L1*b* of the first line group G1, and further find out the second overlapped region R2 between the lateral side S of the identification image I and the second coarse line L2*a* and/or the second fine line L2*b* of the second line group G2. Amounts of the first overlapped region R1 and the second overlapped region R2 can correspond to line amounts of the first line group G1 and the second line group G2 contained by the identification image I. In step S106, the first overlapped region R1 and the second overlapped region R2 can be used to form the first connection line, the second connection line and the intersection point. The position variation of the first connection line and the second connection line can be analyzed to determine the rotated direction and the rotated amplitude of the stick body 14. The position variation of the intersection point can be analyzed to determine the incline direction and the inclined amplitude of the stick body 14. Besides, the interval variation between any two lines of the first line group G1 or the second line group G2, or the intensity variation of the identification image I can be analyzed to determine the pressed amplitude of the stick body 14.

In conclusion, the joystick can store the reference image into the memory; the reference image may be an image captured by the optical sensor at an initial point of time when the joystick is just actuated, or may be a pre-stored image generated during fabrication of the joystick. When the joystick is started, the image identifying method of the present invention can compare the current identification image with the reference image acquired at the initial point of time, to acquire total motion of shifting, rotation and pressing of the stick body in a service period of the joystick. In some specific situations, the joystick 10 may be shifted, rotated and/or pressed by the external force before actuation, so that the image identifying method of the present invention can compare the current identification image with the pre-stored reference image, so as to decide the initial position of the stick body for acquiring the accurate motion of shifting, rotation and pressing of the stick body.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A joystick, comprising:
    a casing, having a hole;

a stick body movably disposed on the casing, the stick body having a first section and a second section, the first section penetrating through the hole to protrude from the casing, the second section being inside the casing;

an identification mark disposed on the second section of the stick body, the identification mark comprising a first line group and a second line group crossed to each other, the first line group and the second line group respectively having a plurality of lines with different widths and arranged adjacent to each other; and an optical sensor disposed inside the casing and adapted to acquire an identification image containing the identification mark, and analyze feature variation of the first line group and the second line group within the identification image to determine a gesture of the stick body;

wherein the first line group comprises several coarse lines and several fine lines, the coarse lines have the same width, the fine lines have the same width, and at least one coarse line is arranged between two fine lines;

wherein the optical sensor analyses several first overlapped regions about the first line group and image sides within the identification image and several second overlapped regions about the second line group and other image sides within the identification image, so as to acquire a first connection line between the first overlapped regions and a second connection line between the second overlapped regions, and then acquire an intersection point of the first connection line and the second connection line.

2. The joystick of claim 1, wherein the coarse lines and the fine lines are parallel to each other.

3. The joystick of claim 1, wherein the second line group comprises several coarse lines and several fine lines, the coarse lines of the second line group have the same width as the coarse lines of the first line group, the fine lines of the second line group have the same width as the fine lines of the first line group.

4. The joystick of claim 1, wherein an interval between one coarse line and an adjacent fine line of the first line group captured in the identification image is smaller than a dimension of a monitoring range of the optical sensor.

5. The joystick of claim 4, wherein the interval is the same as another interval between another coarse line and a related adjacent fine line of the first line group.

6. The joystick of claim 1, wherein one line of the first line group is intersected by the image sides to form two first overlapped regions, and the two first overlapped regions are used to form the first connection line and the intersection point.

7. The joystick of claim 1, wherein two lines of the first line group are intersected by the image sides to form four first overlapped regions, two of the four first overlapped regions are resulted from the same line of the two lines, and the said two first overlapped regions are used to form one corresponding first connection line.

8. The joystick of claim 1, wherein the optical sensor comprises a plurality of sensing units arranged as a matrix, each of the image sides is defined as a capturing region covered by at least one row of the sensing units or at least one column of the sensing units.

9. The joystick of claim 1, wherein the optical sensor analyses position variation of the intersection point to determine an incline direction and inclined amplitude of the stick body.

10. The joystick of claim 1, wherein the optical sensor analyses position variation of the first connection line and the second connection line to determine a rotated direction and a rotated amplitude of the stick body.

11. The joystick of claim 1, wherein the optical sensor analyses intensity variation of the identification image to determine pressed amplitude of the stick body.

12. The joystick of claim 1, wherein the optical sensor analyzes interval variation between two lines of the first line group to determine pressed amplitude of the stick body.

13. The joystick of claim 12, wherein the said two lines of the first line group are adjacent to each other, or at least one line is set between the said two lines of the first line group.

14. The joystick of claim 1, further comprising:
a memory module electrically connected to the optical sensor and adapted to store the identification image and/or a reference image.

15. The joystick of claim 1, wherein the optical sensor has a processor adapted to analyze identification image, or the optical sensor has a transmission interface adapted to transmit the identification image to an external processor for analysis.

16. An image identifying method applied to a joystick, the joystick analyzing an identification mark on a stick body, the identification mark having a first line group and a second line group crossed to each other, the first line group and the second line group respectively having a plurality of lines with different widths arranged adjacent to each other, the image identifying method comprising:
acquiring an identification image containing the identification mark;
acquiring several first overlapped regions about at least one line of the first line group and image sides within the identification image;
acquiring several second overlapped regions about at least one line of the second line group and other image sides within the identification image; and
analyzing the first overlapped regions and the second overlapped regions to determine a gesture of the stick body;
wherein the first line group comprises several coarse lines and several fine lines, the coarse lines have the same width, the fine lines have the same width, each coarse line is arranged between two fine lines.

17. The image identifying method of claim 16, wherein the image identifying method further analyzes whether the said image sides are overlapped by at least one of the coarse lines and the fine lines to acquire the first overlapped regions.

18. The image identifying method of claim 16, wherein the second line group comprises several coarse lines and several fine lines, the coarse lines of the second line group have the same width as the coarse lines of the first line group, the fine lines of the second line group have the same width as the fine lines of the first line group.

19. The image identifying method of claim 18, further comprising:
analyzing position relation between the coarse lines and the fine lines of the first line group relative to the coarse lines and the fine lines of the second line group within the identification image to determine an initial position of the stick body.

20. The image identifying method of claim 16, further comprising:

analyzing dimensional variation in the said overlapped region of the said image sides and the said lines for determining whether to enlarge or reduce sizes of the said image sides.

21. The image identifying method of claim 16, further comprising:
acquiring a first connection line between the first overlapped regions and a second connection line between the second overlapped regions;
acquiring an intersection point of the first connection line and the second connection line; and
analyzing position variation of the intersection point to determine an incline direction and an inclined amplitude of the stick body.

22. The image identifying method of claim 16, further comprising:
acquiring a first connection line between the first overlapped regions and a second connection line between the second overlapped regions; and
analyzing position variation of the first connection line and the second connection line to determine a rotated direction and a rotated amplitude of the stick body.

23. The image identifying method of claim 16, further comprising:
analyzing intensity variation of the identification image to determine a pressed amplitude of the stick body.

24. The image identifying method of claim 16, further comprising:
analyzing interval variation between two lines of the first line group to determine a pressed amplitude of the stick body.

* * * * *